United States Patent [19]

Lindstrom et al.

[11] Patent Number: 4,633,791
[45] Date of Patent: Jan. 6, 1987

[54] OPENER ASSEMBLY INCLUDING A COMPACT, ARC-SHAPED OPENER

[75] Inventors: Harold R. Lindstrom, Des Moines; Virgil D. Haverdink, Ankeny, both of Iowa

[73] Assignee: Deere & Company, Moline, Ill.

[21] Appl. No.: 646,620

[22] Filed: Aug. 31, 1984

[51] Int. Cl.⁴ .............................................. A01C 5/06
[52] U.S. Cl. .......................................... 111/86; 111/85
[58] Field of Search ................................ 111/85–88, 111/14, 52–84; 172/721, 778, 771, 765

[56] References Cited

U.S. PATENT DOCUMENTS

| 626,672 | 6/1899 | Coulthard . | |
|---|---|---|---|
| 1,114,156 | 10/1914 | Lewis et al. | 111/87 |
| 1,167,662 | 1/1916 | Sessler | 111/87 |
| 1,416,331 | 5/1922 | Campbell | 111/87 X |
| 1,573,327 | 2/1926 | Resseguie | 111/86 X |
| 1,643,378 | 9/1927 | Hupp | 111/85 |
| 2,252,372 | 8/1941 | Hand | 111/86 |
| 2,416,189 | 2/1947 | McIntyre | 111/85 |
| 2,656,801 | 10/1953 | Hansen et al. | 111/85 X |
| 2,842,078 | 7/1958 | Immesoete | 111/85 |
| 2,884,880 | 5/1959 | Miller | 111/85 |
| 3,125,169 | 3/1964 | Geisler | 111/86 X |
| 3,251,325 | 5/1966 | Lyland et al. | 111/86 |
| 3,584,588 | 6/1971 | Schultheiss | 111/86 |
| 3,658,018 | 4/1972 | Connor | 111/88 |

FOREIGN PATENT DOCUMENTS

| 676033 | 2/1966 | Belgium | 111/86 |
|---|---|---|---|
| EP61066 | 9/1982 | European Pat. Off. | 111/14 |
| 1196891 | 11/1962 | Fed. Rep. of Germany | 111/86 |
| 2001061 | 11/1978 | Fed. Rep. of Germany | 111/85 |
| 760974 | 3/1934 | France | 111/14 |
| 2236402 | 1/1975 | France | 111/85 |
| 40155 | 7/1914 | Sweden | 111/86 |
| 941264 | 11/1963 | United Kingdom | 111/86 |
| 2104762 | 3/1983 | United Kingdom | 111/85 |
| 420267 | 8/1974 | U.S.S.R. | 111/86 |
| 934954 | 6/1982 | U.S.S.R. | 111/85 |

OTHER PUBLICATIONS

Acra-Plant Sales, Inc. First Class Brochure cover and pp. 18 and 19.
Accord Pneumatic brochure, H. Weiste & Co. GmbH.
Acra-Plant Instructions for Installing Acra-Plant Openers, pp. 2 and 3, Part Number 9572-00 and 9574-00.
D & D Packer Wheels brochure.
Acra-Plant 1981-1982 Catalog cover and pp. 7 and 11.

Primary Examiner—Robert A. Hafer
Assistant Examiner—Danton DeMille

[57] ABSTRACT

In a seeding implement, an opener assembly including a compact, arc-shaped opener with a point supported below the surface of the ground during the field-working operation to prevent hairpinning of trash and allow high-speed seeding. The compact configuration reduces variations in seed placement and minimizes side bend forces. The nose configuration of the opener limits the amount of soil that is lifted and thrown to accommodate narrow row spacings. A notched structure is removably mounted on the boot standard of the assembly and the opener is attached to the structure with a single pin. The support structure bears substantially all the loading on the opener during operation and provides convenient mounting and removal of the opener.

39 Claims, 9 Drawing Figures

OPENER ASSEMBLY INCLUDING A COMPACT, ARC-SHAPED OPENER

BACKGROUND OF THE INVENTION

The present invention relates generally to agricultural implements and more particularly to seeding implements such as grain drills and the like.

Presently existing opener points or shovels utilized with implements such as grain drills generally are of the type that undermine the dirt and plow out a groove for seed. The undermined dirt flows up the shovel or point and has to be divided and thrown off to the side of the opener shank. The distance the dirt is thrown depends upon the amount of dirt picked up, the shank width and the forward speed. In sticky ground conditions, dirt buids up on the shank and causes more dirt throwing. If a runner type of opener is utilized, stalks and other type of trash can hairpin around the runner and render the opener ineffective.

Narrow row seeding can be a problem with presently existing opener points or shovels since it is common for one shovel to throw dirt over a furrow formed by adjacent shovels. The difference in dirt cover effects the growth of the plant, and it is not uncommon to see one row of plants emerge from the ground sooner than an adjacent row. This problem is wholly unacceptable to the farmer, and becomes more acute as he increases the forward speed of the seeding implement to increase productivity. Approaches to solving the dirt-throwing problem include staggering the furrow openers, adding dirt guards around the openers to reduce lateral throwing of the dirt, and adding press wheels which tend to push some of the excess dirt off of the opener rows. These approaches have not been entirely satisfactory in all respects. Staggering the openers does increase trash clearance, but more dirt is still thrown over the rows formed by the forward furrow openers. Shields and additional press wheels increase the expense and complexity of the implement.

Various runner or slicing type of attachments are available for planters, but these are generally utilized with cutting discs to form a slice below the edge of the discs. Many of the runner and slicing type of openers have a relatively large fore-and-aft dimension so that the forward end of the opener is offset a substantial distance ahead of the seed tube. Therefore, exact positioning of the opener on the standard and tight control of the angle of the standard with respect to the vertical is necessary to maintain the proper relationship between the opener and the seed tube. Since many opener assemblies are spring biased into contact with the ground, changes in attitude of the standard are common as the opener encounters various ground conditions. As a result, the relationship between the opener and the seed tube can vary enough to cause unacceptable irregularities in seed placement. In dry conditions, the seed must be deposited relatively deeply in moist soil for good germination, and any substantial change in the relationship between the opener and the seed tube can adversely effect the placement of the seed. Another disadvantage of the relatively long runner or slicing type opener is that side bend forces are increased in proportion to the length of the opener. Trash clearance is also reduced between the opener and the adjacent openers when a long runner or slicer is utilized. The greater the distance between the forward edge of the opener and the lower portion of the supporting standard, the greater the variation in the front edge location with respect to the ground surface as the standard trips in varying ground conditions. For example, in hard soils, the standard will tend to trip rearwardly and therefore cause the front of the runner to point downwardly. In soft ground, the opposite will happen and the point will lift upwardly as the standard rocks ahead. Most runner and slicer type of blades either have a forward nose that extends above the surface of the ground or are used in combination with disc openers, so that at in either situation hairpinning of trash is a common problem. Therefore, problems can easily occur in trashy conditions such as when the openers are utilized in minimum tillage situations. Stub runners have been available for planting corn or the like in rough, trashy conditions to eliminate some hairpinning problems, but these runners have a relatively long dimension in the fore-and-aft direction so that they too are subject to many of the disadvantages noted above.

SUMMARY OF THE INVENTION

It is therefore an object of the present invention to provide an improved opener assembly for a grain drill or the like. It is another object to provide such an opener assembly having an opener which overcomes many of the problems associated with the prior art devices.

It is another object of the present invention to provide an opener assembly which permits seeding at speeds substantially higher than possible with previously available openers while at the same time preventing excess throwing of dirt which would effect the growth of the plants. It is a further object to provide such an opener which obviates extra shields and/or press wheels to provide proper dirt cover of the seeds.

It is yet another object of the invention to provide an improved opener which prevents hairpinning, even in trashy conditions such as where minimum tillage practices are being utilized.

It is another object of the invention to provide an improved opener which decreases side bend forces, increases trash clearance between adjacent openers, and which provides a firm furrow in the moist pan even under varying soil and trash conditions. It is another object to provide such an opener which is less dependent upon standard attitude for proper furrow formation and seed placement than at least most of the previously available openers.

It is another object of the present invention to provide an opener which reduces the amount of dirt undermined and permits relatively high-speed operation without substantial dirt throwing.

It is still another object of the present invention to provide an improved opener assembly with an improved mounting arrangement for attaching a compact opener closely adjacent a boot standard. It is a further object to provide such an assembly with an improved seed boot which is particularly useful in combination with an air distribution system to assure proper placement of the seed behind the opener. It is yet another object to provide an opener with support structure which permits quick and easy replacement of openers and opener types.

BRIEF DESCRIPTION OF THE INVENTION

In accordance with the above objects, an opener assembly is connected to a boot standard and has a compact arc construction with a lower curved edge of small radius extending downwardly and rearwardly from a forward point which is adapted to engage the ground slightly below the surface. The edge lies substantially on the arc of a circle of radius struck on a center offset above the aft end of the body of the opener. The body includes sides extending upwardly and diverging outwardly from the edge at an acute angle to form a generally narrow, V-shaped cross section when viewed from the forward direction. The opener terminates slightly rearwardly of the lowermost portion of the edge and the boot standard opens directly behind the opener and above the edge of the opener. The opener support structure includes a deflecting rod which slopes gently upwardly and rearwardly from the nose or point to a forwardly curved position directly ahead of the upper portion of the boot standard. The rod forms a natural continuation of the opener to reduce dirt throw and decrease trash plugging. The forward upper point of the curved edge goes through the ground slightly below the surface underneath trash and straw cover to prevent hairpinning. The opener permits increased planting speed, on the order of up to seventy percent faster as compared with many prior art openers, without substantial variation in dirt cover from row to row of the planted seeds. The opener provides minimal disturbance of the seed bed to preserve moisture and wedges a narrow, V-shaped furrow in the moist pan for increased capillary action. Loose dirt from the upper portion of the furrow falls in to cover the seeds. The boot standard is narrow on the bottom to direct seeds to the lowermost portion of the furrow, and the boot has an open back side which allows air to escape without excess soil disturbance when the opener is utilized with an air delivery system. The opener, which is preferably has a hard carbide edge, is relatively long lasting, and the compact structure not only decreases side bend forces and increases trash clearance between openers but it also reduces the dependence of proper seed placement on the attitude of the boot standard. The opener is cast to mate with a notched support structure which is mounted on the boot standard so that the opener can be attached utilizing a single pin. The support structure bears substantially all the loading on the opener and relieves the pin of any severe forces during operation for reliable support and ease in changing the opener. In addition, the opener assembly structure permits relatively easy changing of the opener support structure to accommodate different openers for varying types of soil conditions. A spring-loaded press wheel is attached to the boot standard to firm the soil behind the opener, and in the case of wet or firm soil conditions, a disc closing mechanism can be added behind the opener to close the furrow. The press wheel can be used for depth gauging.

These and other objects, features and advantages of the present invention will become apparent to those skilled in the art from the description which follows and from the drawings.

DESCRIPTION OF THE PREFERRED EMBODIMENT

Figure 1:
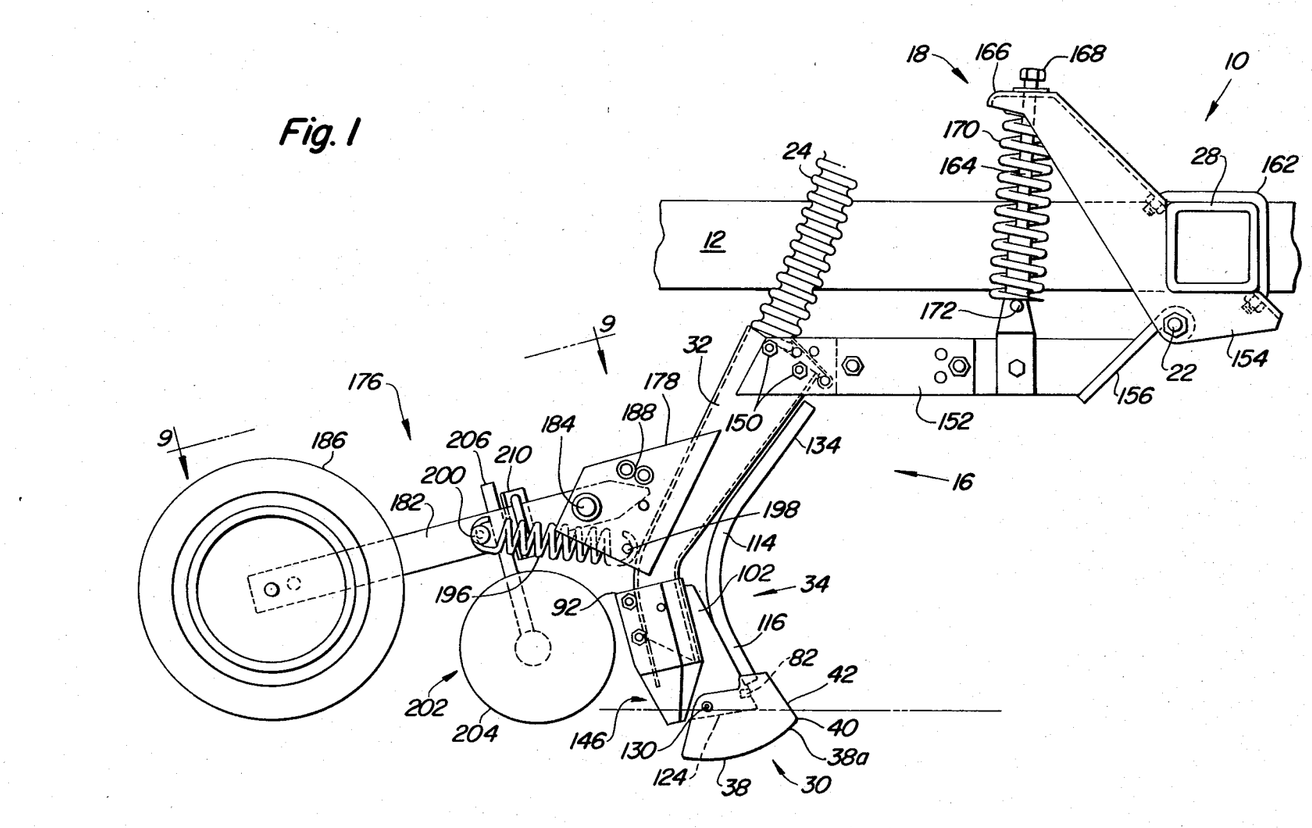
FIG. 1 is a side view of a portion of a seeding implement with the opener assembly constructed in accordance with the teachings of the present invention attached thereto.

Referring to FIG. 1, therein is shown a seeding implement indicated generally at 10 having a transversely extending main frame 12 supported for forward movement over the ground by vertically adjustable wheels (not shown). Supported on the frame 12 are several rows of transversely spaced opener assemblies such as shown at 16. The opener assemblies 16 are connected to the frame 12 by spring bracket assemblies 18 which bias the opener assemblies 16 downwardly but permit each assembly to rock about a transverse pivot 22 to follow the contour of the ground and to permit the opener to penetrate the soil until moist hard pan is reached. A seed tube 24 is connected to the opener assembly 16. Preferably, the tube 24 is part of an air-conveying system wherein seeds and/or fertilizer are delivered from a central hopper (not shown) via an airstream to the opener assembly.

The opener assemblies 16 are preferably spaced uniformly in the transverse direction and are equally divided among three or more transverse beams 28 spaced fore-and-aft on the frame 12 to maximize trash clearance space between adjacent openers. With this type of arrangement, it is important that the opener assemblies on the rearmost beams do not throw too much dirt onto the seeded furrows formed by a preceeding row of opener assemblies. To reduce dirt flow, the opener assembly 16 includes a compact wedge opener 30 mounted on the narrow bottom of a boot standard 32 by supporting structure 34.

In the preferred embodiment, the opener 30 is cast from a chrome alloy material and has a body with a generally arc-shaped configuration (FIGS. 2 and 3) with a curved edge 38 beginning at a forward upper point 40 which is the forwardmost point of a nose section, indicated generally at 42, which is sloped rearwardly and upwardly and is relatively blunt. The curved edge 38 extends downwardly and rearwardly from the point 40 and lies substantially on an arc of a circle of radius $R_1$ having a center 44 located above the rear portion of the opener 30. In the preferred embodiment, a first angle subtended by radius $R_1$ from a vertical line 46 extending through the center 44 to the point 40 of the edge 38 is substantially greater than a second angle subtended by the radius $R_1$ from the line 46 to rear portion 48 of the opener. In the preferred embodiment, $R_1$ is on the order of two times the average depth of penetration of the opener, or about six inches, and the first angle is approximately equal to but slightly less than twice the second angle, with the first angle being approximately forty degrees and the second angle being approximately twenty-three degrees. The lower portion of the opener 30 is substantially solid from the curved edge 38 to a central portion which as viewed in FIG. 3 lies substantially along a line defined by a radius $R_2$, which preferably is approximately eighty percent of $R_1$, and which lies on the same center 44.

Figures 3, 4:
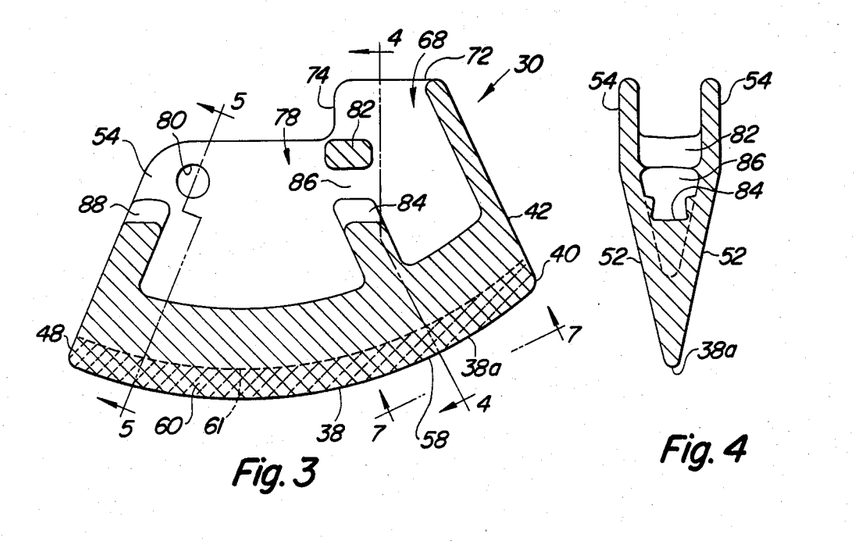
FIG. 3 is a sectional view of the compact wedge opener utilized with the opener assembly of FIG. 2.
FIG. 4 is a sectional view taken along lines 4—4 of FIG. 3.
Figures 5, 7:
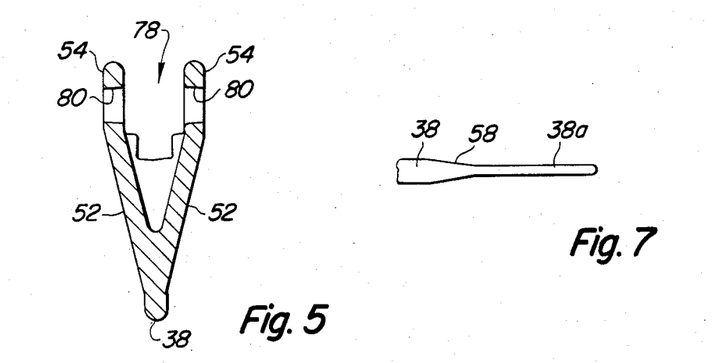
FIG. 5 is a sectional view taken along lines 5—5 of FIG. 3.
FIG. 7 is a view of the forward portion of the curved lower edge of the opener taken generally along lines 7—7 of FIG. 3.

As seen in FIGS. 3–5, a cross section of the lower portion, as viewed from the forward direction, is V-shaped with straight sides 52 extending upwardly from the edge 38. The sides 52 are joined by upright sidewalls 54 located between the nose section 42 and the rear portion 48.

The forward portion 38a of the curved edge tapers outwardly at location 58 (FIG. 7) so that the middle and rearward portions of the edge 38 are substantially wider than the forward section of the edge, designated generally as 38a. The radius of the edge 38 (FIG. 5) is preferably several times greater than that of the radius of the edge 38a (FIG. 4). It has been found that the increased wear surface provided by enlarged edge 38 substantially increases the lifetime of the opener 30 in the area that receives the greatest amount of wear. The narrower forward edge 38a initiates the upper portion of the furrow and the edge 38 and sides 52 wedge the dirt aside to form a furrow. The tapered location 58 of the edge 38 (FIGS. 3 and 7) preferably begins at approximately twenty-five degrees above the vertical line 46. Therefore, the curved edge 38 with enlarged radius extends approximately an equal distance on either side of the line 46. For longer wear, a hardened carbide surface 60 (FIG. 3) is soldered over a notched lower portion or cast right into the lower portion of the opener 30. The surface 60 preferably extends upwardly from the edge 38 several tenths of an inch to a location indicated by the dotted line 61 in FIG. 3.

Figure 6:
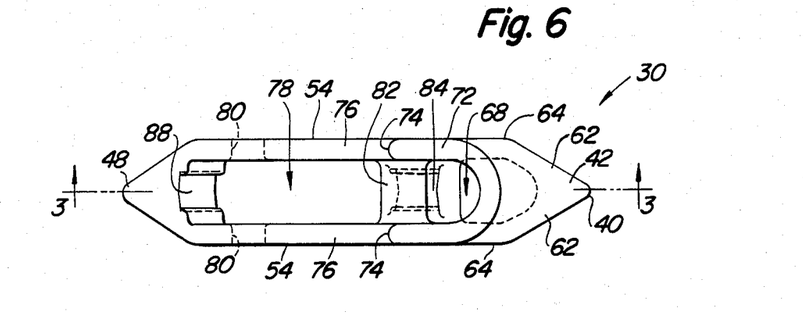
FIG. 6 is a top view of the wedge opener of FIG. 3.

The nose section 42 slopes gently upwardly and rearwardly from the forward upper point 40 with the leading portion of the slope located on the fore-and-aft centerline (FIG. 6) of the opener 30. The nose 42 slopes downwardly and rearwardly on either side of the centerline to a juncture at 62 with the sides 52 and to a juncture 64 with the upright sidewalls 54. Behind the nose section 42 is an upwardly opening cavity 68. The upper portion of the nose section 42 wraps around the cavity 68 (FIG. 6) to form a generally U-shaped, rearwardly and upwardly opening portion 72, the outside wall of which forms a natural extension of the sidewalls 54 near the forward portion of the opener. The U-shaped portion 72 extends downwardly at 74 to a juncture with horizontal top edges 76. A bracket-receiving cavity 78 is defined between the sidewalls 54 and below the edges 76. The aft ends of the sidewalls 54 are apertured at 80. A transverse connecting member 82 extends between the cavities 68 and 78 below the rear of the U-shaped portion 72. A lower transverse connecting member 84 is formed between the sides 52 just below the connecting member 82 so that a transverse gap 86 is defined between the members 82 and 84. A lower rear connecting member 88 extends between the sidewalls 54 at the rear portion 48 of the opener 30. The connecting members 84 and 88 have upwardly directed faces for transferring loads to the bottom of the supporting structure 34.

Figure 2:
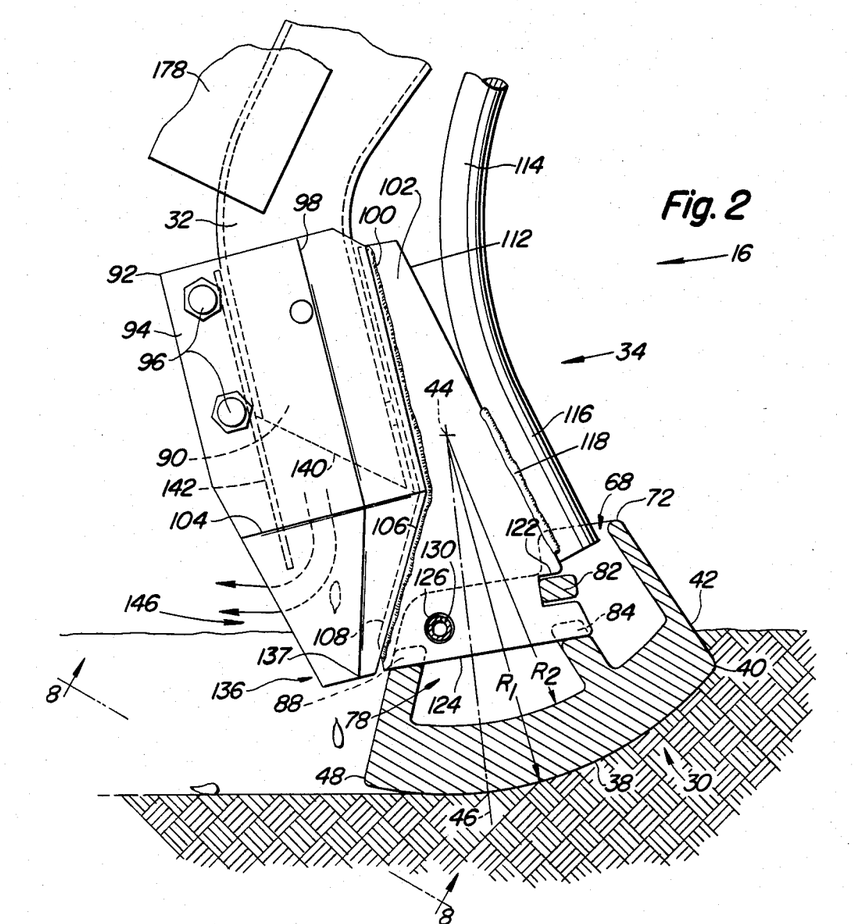
FIG. 2 is an enlarged side view of the lower portion of the opener assembly shown in FIG. 1.
Figure 8:
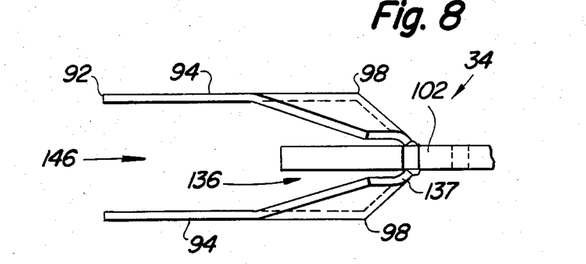
FIG. 8 is a view taken generally along lines 8—8 of FIG. 2.

The wedge opener 30 is connected to the lower end of the boot standard 32 by the supporting structure 34. The structure 34 is selectively attachable to and removable from lower portion 90 of the boot standard 32 utilizing a boot clamp 92. The clamp 92 includes a pair of generally identical side portions 94 which extend around, and are clamped against, the sides of the boot standard 32 by a pair of bolts 96 located directly behind the rear of the bottom portion of the standard 32. The side portions 94 converge forwardly at bend locations 98 to conform to the shape of the lower portion 90 of the boot standard 32 and are welded at locations 100 to either side of an upright plate 102. As best seen in FIGS. 2 and 8, the side portions 94 converge inwardly in the downward direction from a bend location 104, and forward edges 106 of the lower portion of the plates 94 extend downwardly and rearwardly along a corresponding edge 108 of the upright plate 102. The upright plate 102 includes a rearwardly and upwardly sloped forward edge 112; a deflector rod 114, which includes a lower and generally straight end 116, is welded at 118 to the front edge 112. The deflector rod 114 extends upwardly along the front edge 112 and then curves gently forwardly and upwardly therefrom.

The upright plate 102 is notched at 122 just below the lower end 116 of the deflector rod 114 and slightly above lower edge 124 of the plate 102. The plate 102 also includes an aperture 126 adjacent the lower edge 124 and the rear edge 108.

The compact wedge opener 30 is attached to the supporting structure 34 by positioning the connecting member 82 in the notch 122 and raising the aft end of the opener 30 until the apertures 80 in the opener align with the aperture 126 in the upright plate 102. A roll pin 130 is inserted through the apertures 80 and 126 to retain the opener 30 on the plate 102. The aperture 80 is made larger than the diameter of the roll pin 130 so that the opener 30 fits loosely on the upright plate 102, and when the opener assembly 16 is lowered into the ground-working position (FIG. 2), the connecting portions 84 and 88 bear against the bottom 124 of the plate 102 to absorb substantially all of the vertical loading. The forwardly facing edge of the notch 122 contacts the connecting member 82 and receives most of the horizontal loads during the field-working operation. In the mounted position, the opener 30 receives the lower end 116 of the deflector rod 114 within the upwardly opening cavity 68 just behind the U-shaped uppermost portion 72. The lower portion 116 of the rod 114 is angled rearwardly at a slope generally identical to that of the leading edge of the nose section 42. The deflector rod 114 includes a generally straight upper portion 134 (FIG. 1) which extends upwardly in the forward direction along the front surface of the upper portion of the boot standard 32. The change in angle with respect to the vertical from the lower portion 116 to the upper portion 134 is relatively small, preferably on the order of about less than a thirty degree rearward slope on the lower portion to about a thirty degree forward slope on the upper portion. The nose section 42 and the deflector rod 114 function to provide a smooth and generally continuous curved surface which changes direction gradually for shedding trash and minimizing dirt flow during the field-working operation.

As best seen in FIGS. 2 and 8, the side portions 94 of the clamp assembly 90 converge to a relatively narrow downwardly and rearwardly opening seed channel indicated generally at 136. The seed channel 136 angles forwardly from the vertical in the downward direction so that the seeds are directed toward the rear portion 48 of the opener 30. The lower, forward edge 137 of the channel 136 is generally U-shaped and has a width less than or equal to the width of the rear portion 48. The plate 102 supports the opener 30 so that the wide section of the "V" near the rear portion 48 of the opener is closely adjacent the lower edge of the side portions 94.

As best seen in FIG. 2, the attitude and location of the boot clamp 92 which defines the seed channel 136 provides a very compact structure in the fore-and-aft direction. The boot standard 32, which is of conventional construction, includes a diagonally extending lower opening 140 and to assure that the seeds are directed to the seed channel 136, a transversely extending baffle plate 142 conforming to the shape of the aft end of the lower portion 90 is connected between the side portions 94 directly behind the standard 32. However, the plate 142 terminates substantially above the lower portion of the side portions 94 to provide a rearwardly directed air opening, indicated generally at 146 so that when the seeds are conveyed by an air system, the air may be exhausted efficiently without overly disturbing seeds and loose dirt in the furrow.

The entire supporting structure 34 may be selectively removed from the boot standard 32 by loosening the bolts 96 and thereafter sliding the assembly off of the lower portion of the standard 32. The wedge opener 30, therefore, may be replaced with a conventional opener, such as a hoe opener, without extensive and time-consuming replacement of all or a substantial portion of the opener assembly 16. Also, the openers 30 may be quickly and easily removed from the plate 102 and replaced by removing the roll pin 130 so that the connecting member 82 may be slid forwardly from the notch 122. To attach the opener 30, the reverse procedure is applied.

The boot standard 32 is connected by bolts 150 to a fore-and-aft extending arm 152 (FIG. 1), which in turn is pivotally connected to the lower end of a channel-shaped bracket 154 by a pivot plate 156. The pivot plate 156, and therefore the entire opener assembly 16, is connected for rocking about the transverse pivotal connection 22 which extends between the sides of the bracket 154. A bolt 162 connects the bracket 154 to one of the transverse beams 28 on the frame 12. A tension link 164 is connected to the arm 152 rearwardly of the pivot 22 and extends upwardly through the top 166 of the bracket 154 and terminates in an enlarged head 168 which prevents the opener from dropping below a preselected position when the frame 12 is raised on the vertically adjustable ground wheels. A spring 170 is compressed between the top 166 and a pin 172 mounted on the tension link 164. The spring biases the assembly downwardly to a ground-engaging position when the frame 12 is lowered during seeding operations. The frame 12 may be raised to a transport position wherein the opener assembly is located substantially above the surface of the ground.

A firming wheel assembly 176 (FIG. 1) is attached to the rear portion of the boot standard 32 between the clamp assembly 90 and below the arm 152. The firming wheel assembly 176 includes a bracket 178 welded to the boot standard 32 and a fore-and-aft extending drawbar 182 connected at its forward end to the bracket 178 by a transverse pivot 184. The aft end of the drawbar 182 rotatably mounts a press wheel 186 which trails directly behind the corresponding opener 30. The drawbar 182 extends forwardly from the pivot 184, and upper stops 188 connected to the side of the bracket 178 are contacted by the forward portion of the drawbar 182 to prevent the press wheel from dropping below a preselected position with respect to the opener 30 when the opener assembly 16 is raised with the frame 12 from the ground. A spring 196 is tensioned between a bolt 198 located on the bracket 178 and a bolt 200 located on the drawbar 182 to bias the press wheel 186 downwardly into the ground-engaging position when the opener assembly 16 is operating in the field. The bolt 198 also functions as a stop to limit the upward rocking of the drawbar 182. The sppring 196 may be replaced with a rigid link having an adjustable length so that the press wheel 186 will provide adjustable depth gauging.

Figure 9:
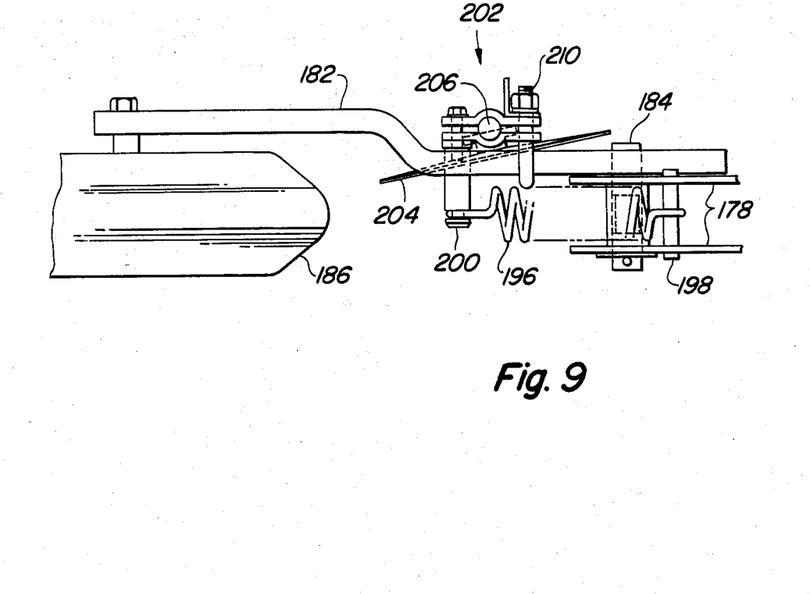
FIG. 9 is a view taken generally along lines 9—9 of FIG. 1.

In certain soil conditions where the formed furrow does not tend to close upon itself, a closing disc assembly 202 is connected to the drawbar 182 to follow closely adjacent the rear of the opener 30. The closing disc assembly 202 includes an angled disc 204 mounted on a standard 206 for rotation in an upright plane which forms an acute angle with respect to the forward direction (FIG. 9). A conventional bracket assembly 210 mounts the standard 206 on the drawbar 182 so that the disc 204 shallowly penetrates the soil closely adjacent one side of the furrow formed by the opener 30 to close the furrow.

The seeding implement 10 includes a plurality of the opener assemblies 16 transversely spaced on the main frame 12 in preferably three or more fore-and-aft spaced rows across the width of the frame. The openers 30 throw very little dirt so that very narrow row spacings can be provided. In operation, the frame 12 is lowered so that the opener assemblies 16 move to their ground-working positions wherein the forward point 40 of the opener 30 is located slightly below the top surface of the soil (FIG. 2) so that hairpinning of the trash is avoided. Relatively little dirt is picked up by the opener 30. As the implement 10 is moved forwardly through the field, the relatively straight sides 52 of the openers 30 move dirt to the side rather than digging the dirt upwardly so that essentially a narrow furrow is wedged into the soil. The narrow front edge 38a of the lower curved portion of the opener 30 initiates a groove while the more rearwardly located portion 38 does the substantial portion of the pushing of the soil to firm the furrow. The lowermost portion of the edge 38 is located substantially below the point 40 during normal soil operating conditions so that the bottom of the furrow is located in relatively damp hard pan. The opener 30 will be biased into the soil until the curved edge 38 penetrates the moist hard pan area, and typically the depth of penetration of the shovel 30 is on the order of 2½ to 3 inches below the surface of the ground. The nose section 42 of the opener 30 is slightly rounded and relatively blunt so that a small amount of dirt is lifted up to help push trash off the front of the opener assembly 16. The trash-shedding surface defined by the nose section 42 and the deflector rod 114 efficiently sheds trash and debris for a relatively non-clogging arrangement. The nose section 42 moves just enough soil upwardly to the deflector rod 114 to keep the trash moving effectively.

As the shovel 30 is moved forwardly through the soil, a conventional air distribution system moves seeds through the seed tube 24 and into the seed boot standard 32. The seeds are propelled into the seed channel 136 by a volume of air and into the furrow directly behind the rear portion 48 of the opener 30 (FIG. 2). The rearwardly directed opening 146 which is located above the surface of the ground when the opener 30 is in the soil-working position permits the air to escape without overly disturbing the seeds in the furrow or loose dirt around the furrow. In most loose soil conditions the soil around the newly formed furrow will collapse over the seeds so that the closing disc assembly 202 can be eliminated. However, in firm ground the closing disc assembly 202 may be necessary to assure proper coverage of the newly planted seeds. In average working conditions, the line indicated at 46 in FIG. 2 will assume a generally vertical position. However, in firmer or looser soil conditions the assembly 16 will tend to rock rearwardly or forwardly, respectively, over a range of several degrees from that shown by the line 46. However, the very compact and arc-shaped structure of the opener 30, combined with the closely spaced seed channel 136 helps to compensate for such changes and prevents any substantial deviation in the furrow-forming and seed-depositing characteristics of the assembly. In addition, as best seen in FIGS. 1 and 2, as the assembly 16 rocks downwardly to increase the depth of penetration of the opener 30, the point 40 will tend to go up to reduce fluctuations in the depth of penetration of the point. Likewise, when the assembly 16 rocks upwardly in harder ground for shallower penetration, the point will angle downwardly. The relatively short distance between the forward extremity of the opener 30 and the location of the seed channel 136 helps to keep the seed in the same relationship to the opener as the assembly 16 pivots with changing soil conditions.

Having described the preferred embodiment, it will be apparent that modifications can be made without departing from the scope of the invention as defined in the accompanying claims.

We claim:

1. For a seeding implement, a furrow opener assembly adapted for towing forwardly through a field where trash is present on the surface of the ground, said opener assembly comprising:

an upright boot standard adapted to be rockably connected to the implement and having a lower end and a seed channel opening downwardly from the lower end;

supporting structure connected to the lower end of the standard;

fore-and-aft extending furrow-forming means for wedging a narrow material-receiving furrow a preselected distance below the surface of the ground as the assembly is towed forwardly, said furrow-forming means comprising a compact body having a forwardly located nose section and a point defining the forwardmost extremity of the body, a lower curved edge extending downwardly and rearwardly from the point to a lowermost portion of the body, said lowermost portion closely adjacent the aft end of the body, the aft end of said curved edge lying on the arc of a circle of radius R struck on a center offset above the aft end of the body, said body further including sides extending upwardly and diverging outwardly at an acute angle from the edge, said edge and sides presenting a V-shaped cross section substantially the length of the body, wherein said nose section includes a narrow soil-deflecting surface sloping gently rearwardly and upwardly from the point for providing a small amount of trash-moving said flow upwardly from the point;

means mounting the furrow-forming means on the supporting structure with the point located below the surface of the ground to prevent hairpinning of the trash around the curved edge and with the lowermost portion of the body located forwardly of the aft end of the body; and wherein the point and the aft end of the body define the fore-and-aft extremities of the furrow-forming means and the point is spaced from the aft end of the body a distance less than twice the preselected distance and wherein the radius R is less than approximately twice the preselected distance to thereby minimize changes in furrow-forming and material placement characteristics as the boot standard rocks.

2. The invention as set forth in claim 1 wherein the preselected distance is approximately two and one-half to three inches and R is approximately six inches.

3. The invention as set forth in claim 2 wherein substantially the entire curved edge lies on the arc of the circle.

4. In a seeding implement having a frame adapted for forward movement over the ground and an upright standard projecting from the frame and movable vertically to a soil-engaging position, a compact opener assembly for forming a seed-receiving furrow, said opener comprising:

a main force-and-aft extending opener body having a lower edge struck substantially on an arc of a circle centered at a location above the body, said edge subtending an angle of less than ninety degrees, said body having generally flat, outwardly diverging sides extending upwardly from the edge and presenting a narrow, V-shaped cross section along a major portion of the edge when viewed from the forward direction; a nose section extending upwardly and rearwardly from the fore end of the edge and defining with said edge a forward ground-penetrating point; and wherein said body further includes an upwardly opening cavity located adjacent the nose section, said opener assembly further comprising upright deflector structure having a lower end received with the cavity, said deflector structure extending upwardly from, and forming a generally continuous extension of, the nose section for limiting dirt throw and improving trash flow; and means for supporting the opener from the standard with the ground penetrating point and lower portion of the nose section below the surface of the ground to prevent hairpinning of trash around the edge when in the soil-engaging position with the arc center located above the body on a vertical line passing through the aft end of the body so that the aft end is located substantially lower than said ground penetrating point.

5. The invention as set forth in claim 4 wherein the arc defining the edge has a radius R, and the aft end of the edge penetrates the ground a distance of at least 0.4 R when the standard is in the soil-engaging position.

6. The invention as set forth in claim 4 wherein the means for supporting includes a body-receiving clamp structure selectively attachable to and removable from the lower end of the standard.

7. The invention as set forth in claim 6 wherein the clamp structure includes a downwardly directed lower edge, said opener body including an upwardly directed edge contacting portion, and pin means loosely supporting the opener body on the clamp structure with the lower edge closely adjacent the contacting portion for permitting the lower edge to absorb substantially all the vertical loading of the opener body when the standard is in the soil-engaging position.

8. The invention as set forth in claim 7 wherein the forward end of the opener body includes a connecting member and the clamp structure includes a forward edge having a notch for slidably receiving the connecting member therein, said pin means retaining the connecting member in the notch.

9. The invention as set forth in claim 8 wherein the aft end of the opener body is apertured, and the clamp structure includes a mating aperture, said pin means including a single transverse pin selectively insertable through the apertures, said notch and pin cooperating to loosely secure the opener body to the clamp structure when the pin is inserted, and when the pin is removed, permitting the connecting member to be removed from the notch so that the opener body may be removed from the clamp.

10. The invention as set forth in claim 4 wherein the means for supporting includes opener mounting structure selectively attachable to and removable from the lower end of the standard, and wherein said deflector rod is connected to the mounting structure for attachment and removal therewith.

11. In a seeding implement having a frame adapted for forward movement over the ground and an upright standard projecting from the frame and movable vertically to a soil-engaging position, a compact opener assembly for forming a seed-receiving furrow, said assembly comprising:
a main fore-and-aft extending opener body having a lower edge and generally flat, outwardly diverging sides extending upwardly from the edge and presenting a narrow, V-shaped cross section along a major portion of the edge when viewed from the forward direction, and a nose section extending upwardly and rearwardly from the fore end of the edge and defining with said edge a forward ground-penetrating point; and
means for supporting the opener from the standard when in the soil-engaging position with the point and lower portion of the nose section below the surface of the ground to prevent hairpinning of trash around the edge, wherein the means for supporting includes a body-receiving clamp structure connected to the lower end of the standard, said clamp structure including a downwardly directed lower edge portion, said opener body including an upwardly directed edge contacting portion, and pin means loosely supporting the opener body on the clamp structure with the lower edge portion closely adjacent the contacting portion for permitting the lower edge portion to absorb substantially all the vertical loading of the opener body when the standard is in the soil-engaging position.

12. The invention as set forth in claim 11 wherein the lower edge is struck substantially on an arc of a circle centered at a location above the body, said arc having a radius R, and the aft end of the edge penetrates the ground in a range of between approximately 0.4 R to 0.6 R when the standard is in the soil-engaging position.

13. The invention as set forth in claim 12 wherein R is approximately six inches.

14. The invention as set forth in claim 11 wherein the width of the edge increases in the rearward direction.

15. The invention as set forth in claim 14 wherein the edge is rounded.

16. The invention as set forth in claim 11 wherein the body comprises a unitary cast structure and the body portion adjacent the edge is substantially solid, said body further including an upper, somewhat hollowed portion for receiving the means for supporting.

17. The invention as set forth in claim 11 wherein the body-receiving clamp structure is selectively attachable to and removable from the standard.

18. The invention as set forth in claim 11 wherein the forward end of the opener body includes a connecting member and the clamp structure includes a forward edge having a notch for slidably receiving the connecting member therein, said pin means retaining the connecting member in the notch.

19. The invention as set forth in claim 18 wherein the aft end of the opener body is apertured, and the clamp structure includes a mating aperture, said pin means including a single transverse pin selectively insertable through the apertures, said notch and pin cooperating to loosely secure the opener body to the clamp structure when the pin is inserted, and when the pin is removed, permitting the connecting member to be removed from the notch so that the opener body may be removed from the clamp.

20. The invention as set forth in claim 17 wherein the clamp structure includes side portions extending downwardly from the lower end of the standard and defining a downwardly and rearwardly opening seed channel located closely adjacent the aft end of the opener body.

21. The invention as set forth in claim 20 wherein the seed channel is connected to an air-conveying system and when the standard is in the soil-engaging position, the seed channel opens above the surface of the ground to provide an air escape area.

22. The invention as set forth in claim 20 wherein the seed channel includes a forward portion rearwardly adjacent the aft end of the opener body near the top of the V-shaped section, said forward portion having a width less than or equal to the width of said top of the section.

23. The invention as set forth in claim 11 wherein said body further includes an upwardly opening cavity located adjacent the nose section, said opener assembly further comprising an upright deflector rod having a lower end received within the cavity, said rod extending upwardly from, and forming a generally continuous extension of, the nose section for limiting dirt throw and improving trash flow.

24. The invention as set forth in claim 23 wherein the means for supporting includes opener mounting structure selectively attachable to and removable from the lower end of the standard, and wherein said deflector rod is connected to the mounting structure for attachment and removal therewith.

25. For a seeding implement, a furrow opener assembly adapted for towing forwardly through a field where trash is present on the surface of the ground, said opener assembly comprising:
an upright boot standard having a lower end and a seed channel opening downwardly from the lower end;
supporting structure connected to the lower end of the standard;
fore-and-aft extending furrow-forming means for wedging a narrow furrow a preselected distance below the surface of the ground as the assembly is towed forwardly, said opening means comprising a compact body having a forwardly located nose section and a point defining the forwardmost extremity of the body, a lower edge extending rearwardly from the point to a lowermost portion of the body, said lowermost portion closely adjacent the aft end of the body, said body further including sides extending upwardly and diverging outwardly at an acute angle from the edge, said edge and sides presenting a V-shaped cross section substantially the length of the body, wherein said nose section includes a narrow soil-deflecting surface sloping gently rearwardly and upwardly from the point for providing a small amount of trash-moving soil flow upwardly from the point;

means mounting the furrow-forming means on the supporting structure with the point located below the surface of the ground to prevent hairpinning of the trash around the lower edge; and wherein the supporting structure comprises a pair of side portions extending on either side of, and conforming generally to the shape of, the lower portion of the standard, an upright plate connected to the side portions forwardly of the standard and including a leading edge having a rearwardly indented notch, said plate including an aperture located rearwardly of the notch, and wherein the body of the furrow-forming means includes a transverse member extending between the sides and adapted for receipt in the notch, said furrow-forming means including an aperture extending transversely through the body, said body movable with respect to the transverse member so that the apertures align, and pin means insertable through the aligned apertures for locking the furrow-forming means on the supporting sturcture.

26. The invention as set forth in claim 25 wherein the seed channel angles forwardly from the vertical in the downward direction toward the aft end of the body.

27. The invention as set forth in claim 25 wherein the seed channel opens rearwardly above the surface of the ground to permit air directed through the standard to exit the seed channel without disturbing the furrow.

28. The invention as set forth in claim 25 further comprising an upright deflector rod connected to the supporting structure and extending the soil-deflecting surface above the surface of the ground forwardly of the boot standard.

29. The invention as set forth in claim 28 wherein the furrow-forming means is slidably received on the supporting structure for attachment to and removal therefrom and includes a surface matingly receiving the lower end of the deflector rod when said means is attached.

30. The invention as set forth in claim 28 wherein the supporting structure, and therefore the deflector rod, are selectively attachable to and removable from the standard.

31. The invention as set forth in claim 25 wherein the aft end of said lower edge lied substantially on the arc of a circle of radius R struck on a center offset above the aft end of the body, the radius R being on the order of two times the depth of penetration of the furrow-forming means.

32. The invention as set forth in claim 25 wherein the edge adjacent the point is substantially narrower than the edge adjacent the aft end of the body.

33. The invention as set forth in claim 32 wherein the lower portion of the body includes a hardened carbide surface.

34. The invention as set forth in claim 25 including a furrow-closing disc supported from the standard rearwardly adjacent the aft end of the furrow-forming means.

35. The invention as set forth in claim 25 wherein the supporting structure comprises a pair of side portions extending on either side of, and conforming generally to the shape of, the lower portion of the standard, an upright plate connected to the side portions forwardly of the standard and including a leading edge having a rearwardly indented notch, said plate including an aperture located rearwardly of the notch, and wherein the body of the furrow-forming means includes a transverse member extending between the sides and adapted for receipt in the notch, said furrow-forming means including an aperture extending transversely through the body, said body movable with respect to the transverse member so that the apertures align, and pin means insertable through the aligned apertures for locking the furrow-forming means on the supporting structure.

36. The invention as set forth in claim 33 wherein the body is cast from a hard metal and the hardened carbide surface is cast directly in the body.

37. The invention as set forth in claim 25 including a drawbar structure connected in trailing relationship to the boot standard and a press wheel supported by the drawbar for compacting the soil in the corresponding furrow.

38. The invention as set forth in claim 37 wherein the drawbar structure includes depth-gauging means for affecting the depth of penetration of the furrow-forming means.

39. The invention as set forth in claim 28 wherein the rod angles rearwardly and upwardly from the soil-deflecting portion to a central rod portion, and upwardly and forwardly from the central portion to a top portion, wherein the change in angle from the soil-deflecting portion to the top portion is substantially less than ninety degrees.

* * * * *